(12) United States Patent  (10) Patent No.: US 8,796,565 B2
Lauer                     (45) Date of Patent:     Aug. 5, 2014

(54) SCALE WITH DISHWASHER SAFE COVER

(75) Inventor: Robert W. Lauer, Winchester, VA (US)

(73) Assignee: Rubbermaid Commercial Products, LLC, Winchester, VA (US)

( * ) Notice: Subject to any disclaimer, the term of this patent is extended or adjusted under 35 U.S.C. 154(b) by 176 days.

(21) Appl. No.: 13/288,408

(22) Filed: Nov. 3, 2011

(65) Prior Publication Data

US 2012/0125697 A1    May 24, 2012

Related U.S. Application Data

(60) Provisional application No. 61/410,583, filed on Nov. 5, 2010.

(51) Int. Cl.
*G01G 21/28* (2006.01)

(52) U.S. Cl.
USPC .......................................... 177/243

(58) Field of Classification Search
USPC ............ 73/180, 181, 238–243; 177/180, 181, 177/238–243, 126, 262
See application file for complete search history.

(56) References Cited

U.S. PATENT DOCUMENTS

| | | | | |
|---|---|---|---|---|
| 3,811,523 | A * | 5/1974 | Artwick et al. | 177/180 |
| 4,050,531 | A | 9/1977 | Ashbrook | |
| 4,526,246 | A * | 7/1985 | Patoray | 177/179 |
| 4,862,978 | A * | 9/1989 | Borchard | 177/180 |
| 5,033,562 | A * | 7/1991 | Cone | 177/128 |
| 6,998,544 | B2 * | 2/2006 | Nomura | 177/181 |
| 7,323,141 | B2 * | 1/2008 | Kirchhevel et al. | 422/68.1 |
| D682,129 | S * | 5/2013 | Kesselman | D10/91 |
| 2002/0040814 | A1 | 4/2002 | Luchinger et al. | |
| 2008/0271929 | A1 * | 11/2008 | Whitney | 177/25.12 |
| 2009/0114455 | A1 | 5/2009 | Mueller et al. | |
| 2009/0205877 | A1 * | 8/2009 | Claypool | 177/239 |
| 2010/0133016 | A1 | 6/2010 | Mannhart et al. | |

FOREIGN PATENT DOCUMENTS

| | | | | |
|---|---|---|---|---|
| JP | 2005140624 | * | 6/2005 | G01G 21/30 |
| JP | 2008116224 A | * | 5/2008 | G01G 21/28 |

OTHER PUBLICATIONS

International Searching Authority, Written Opinion issued for International application No. PCT/US11/59369, Mar. 12, 2012.
International Searching Authority, International Search Report issued for International application No. PCT/US11/59369, Mar. 12, 2012.

* cited by examiner

*Primary Examiner* — Randy W Gibson
*Assistant Examiner* — Natalie Huls
(74) *Attorney, Agent, or Firm* — Dennis J. Williamson; Moore & Van Allen PLLC

(57) ABSTRACT

A scale and cover comprises an electronic scale comprising a scale tray and a user control and a first alignment mechanism. A cover for removably receives the electronic scale where the cover defines an aperture communicating the exterior of the cover with the electronic scale. The cover comprises a second alignment mechanism that engages the first alignment mechanism. A tray comprises a leg that is inserted through the aperture and is supported by the scale tray.

18 Claims, 8 Drawing Sheets

SCALE WITH DISHWASHER SAFE COVER

This application claims benefit of priority under 35 U.S.C. §119(e) to the filing date of to U.S. Provisional Application No. 61/410,583, as filed on Nov. 5, 2010, which is incorporated herein by reference in its entirety.

BACKGROUND

Digital and mechanical scales operate in environments such as commercial kitchens where they are exposed to greases, liquids and food products. These materials soil and coat not only the tops and fronts/keypads of the scale, but also the sides and bottoms. When not cleaned, the soiled scales may harbor bacteria. The soiled scales are also more difficult to handle.

Mechanical scales that have no electronic parts that can be damaged by moisture and water may be 'dish-washer safe' or 'wash-down safe' when made from non-rusting materials such as stainless steel. Such scales may be cleaned by steam, hot-water, detergents and water pressure; however, digital scales have electronic components that may be damaged by moisture. Attempts to render these scales "dishwasher safe" rely on gaskets, seals and other devices around the electrical components and all openings in the scale body. These additional components raise the cost of the scale and these devices typically cannot protect the scale from the environment of a commercial dishwasher. Attempts have been made to cover the tops, fronts and sides of digital scales with clear plastic 'shields'; however, these shields are not durable, and do not last the life of the scale. The known shields are also difficult to clean.

While some scales may be washable, these scales cannot be used in dishwashers because of the high water temperature and water pressure associated with dishwashers. Simply washing down a scale may leave a residue film of grease and bacteria. The difficulty in cleaning electronic scales is one of several reasons why commercial chefs prefer mechanical scales over digital scales.

SUMMARY OF THE INVENTION

A scale and cover comprises an electronic scale comprising a scale tray and a user control and a first alignment mechanism. A cover removably receives the electronic scale where the cover defines an aperture communicating the exterior of the cover with the electronic scale. The cover supports a flexible membrane where the flexible membrane is disposed over the user control. The cover comprises a second alignment mechanism that engages the first alignment mechanism. A tray comprises a leg that is inserted through the aperture and is supported by the scale tray.

The user control may comprise a push button. The flexible membrane may be transparent, may comprise indicia to identify the control, may be opaque and may comprise a printed button. The scale may comprise a scale housing that defines a second aperture that communicates with the scale tray where the second aperture is aligned with the aperture to receive the leg. The scale tray may comprise a receptacle that receives the leg. The cover may define an interior space that is dimensioned to receive the scale and may comprise an opening communicating with the interior space. A tray cover may cover the tray. The first alignment mechanism may comprise one of an elongated recess and a raised rib and the second alignment mechanism may comprise another one of the elongated recess and the raised rib. A fastener may secure the cover to the scale.

A scale and cover comprises an electronic scale comprising a scale tray and a display and a first alignment mechanism. A cover removably receives the electronic scale where the cover defines a first plurality of apertures communicating the exterior of the cover with the electronic scale. The cover comprises a window that is disposed over the display. The cover comprises a second alignment mechanism that engages the first alignment mechanism. A tray comprises a plurality of legs that are inserted through the first plurality of apertures and are supported by the scale tray.

The scale may comprise a scale housing that defines a second plurality of apertures that communicates with the scale tray where the second plurality of apertures are aligned with the first plurality of apertures where the plurality of legs are inserted through the first plurality of apertures and the second plurality of apertures. The cover may define an interior space that is dimensioned to receive the scale and comprises an opening communicating with the interior space. The first alignment mechanism may comprise one of a recess and raised rib and the second alignment mechanism may comprise another one of the recess and the raised rib. The first alignment mechanism may slide on the second alignment mechanism when the scale is inserted in the opening. A fastener may secure the cover to the scale. A tray cover may cover the tray.

A method of operating a scale and a scale cover comprises providing an electronic scale comprising a scale tray and a first alignment mechanism and a cover for removably receiving the electronic scale comprising a second alignment mechanism and an aperture; aligning the first alignment mechanism with the second alignment mechanism; pushing the scale into the cover until the aperture is aligned with the scale tray; and mounting a tray on the scale tray by inserting a leg on the tray through the aperture such that the leg is supported on the scale tray.

DETAILED DESCRIPTION OF EMBODIMENTS OF THE INVENTION

Figure 1:
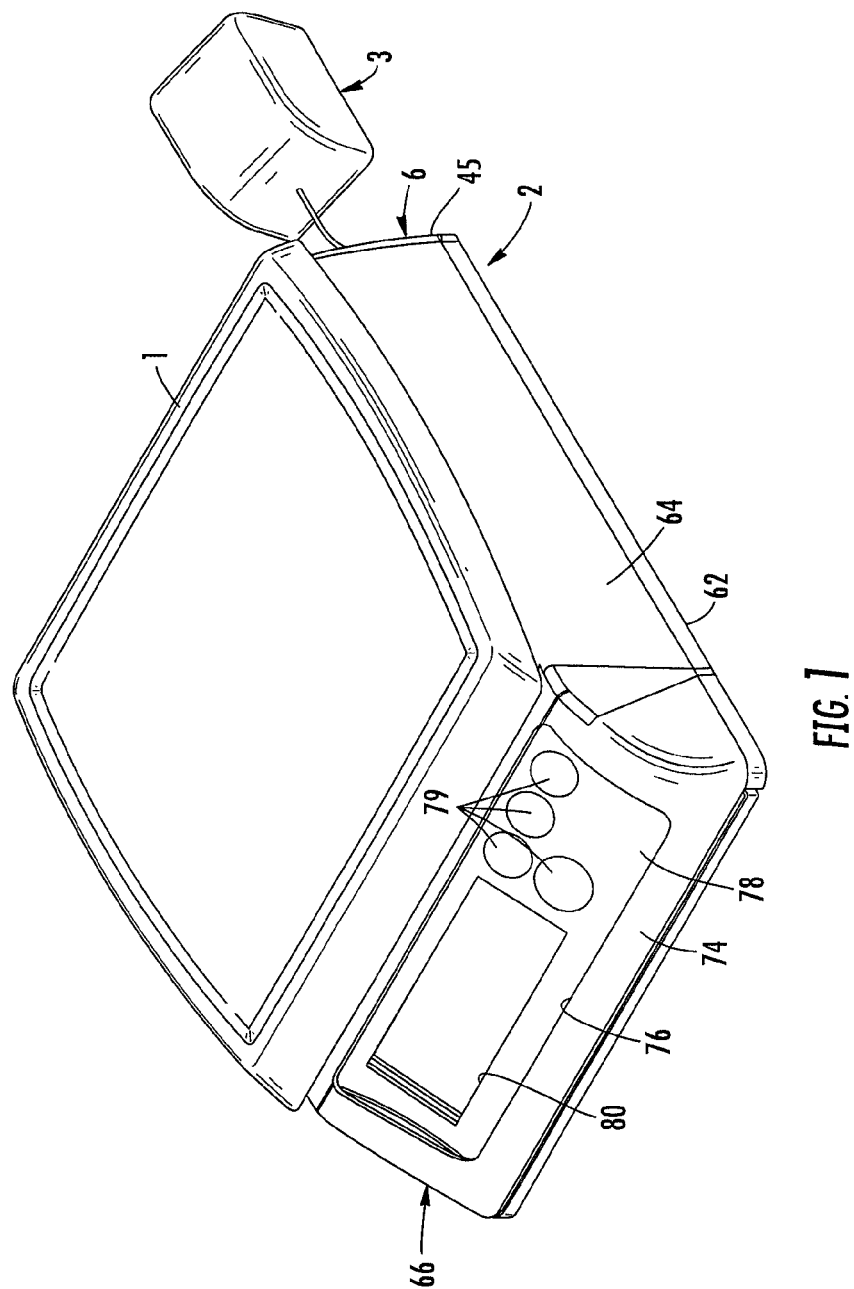
FIG. 1 is a top perspective view of one embodiment of the scale and cover of the invention.
Figure 2:
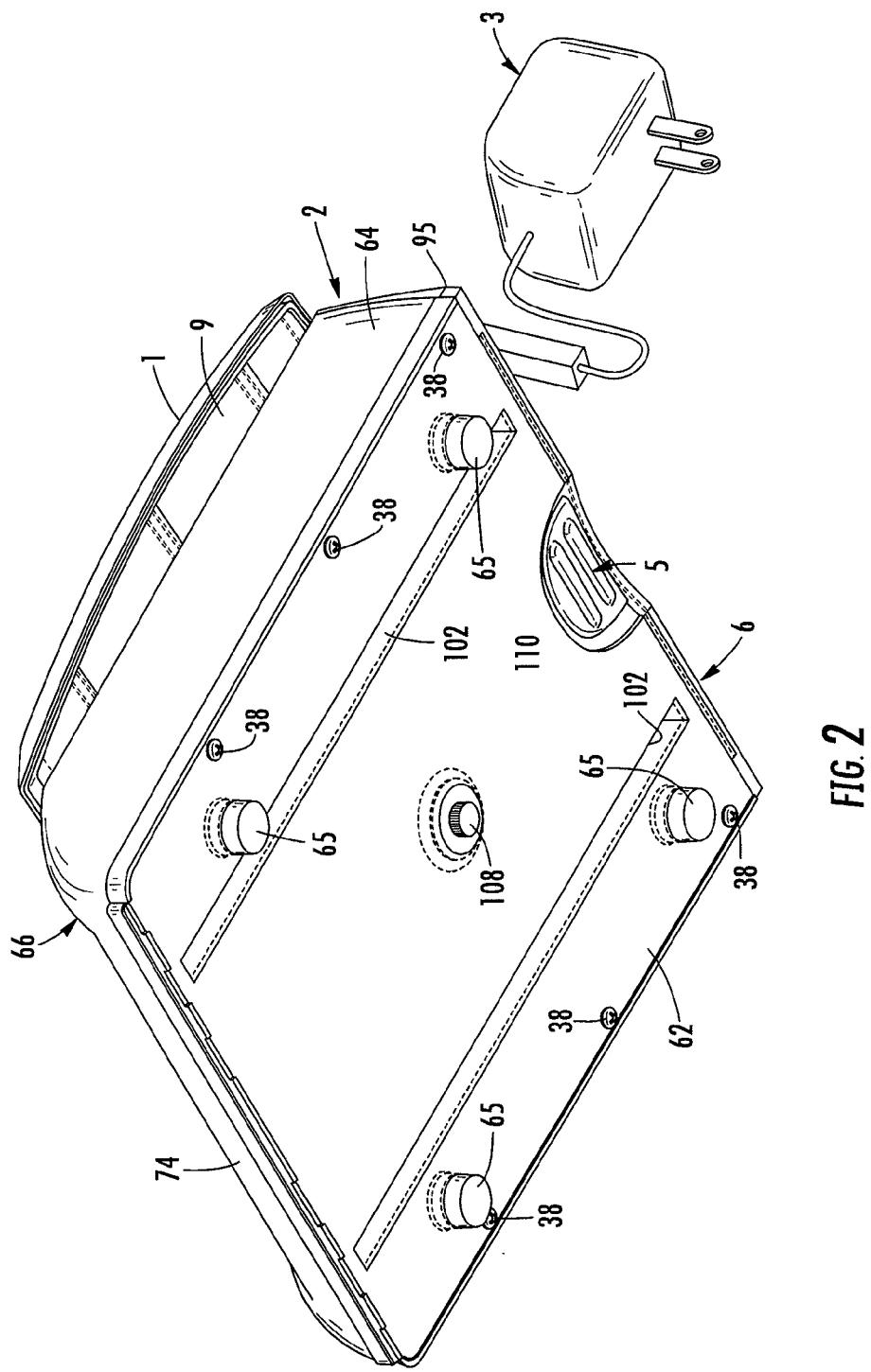
FIG. 2 is a bottom perspective view of the scale and cover of FIG. 1.
Figure 3:
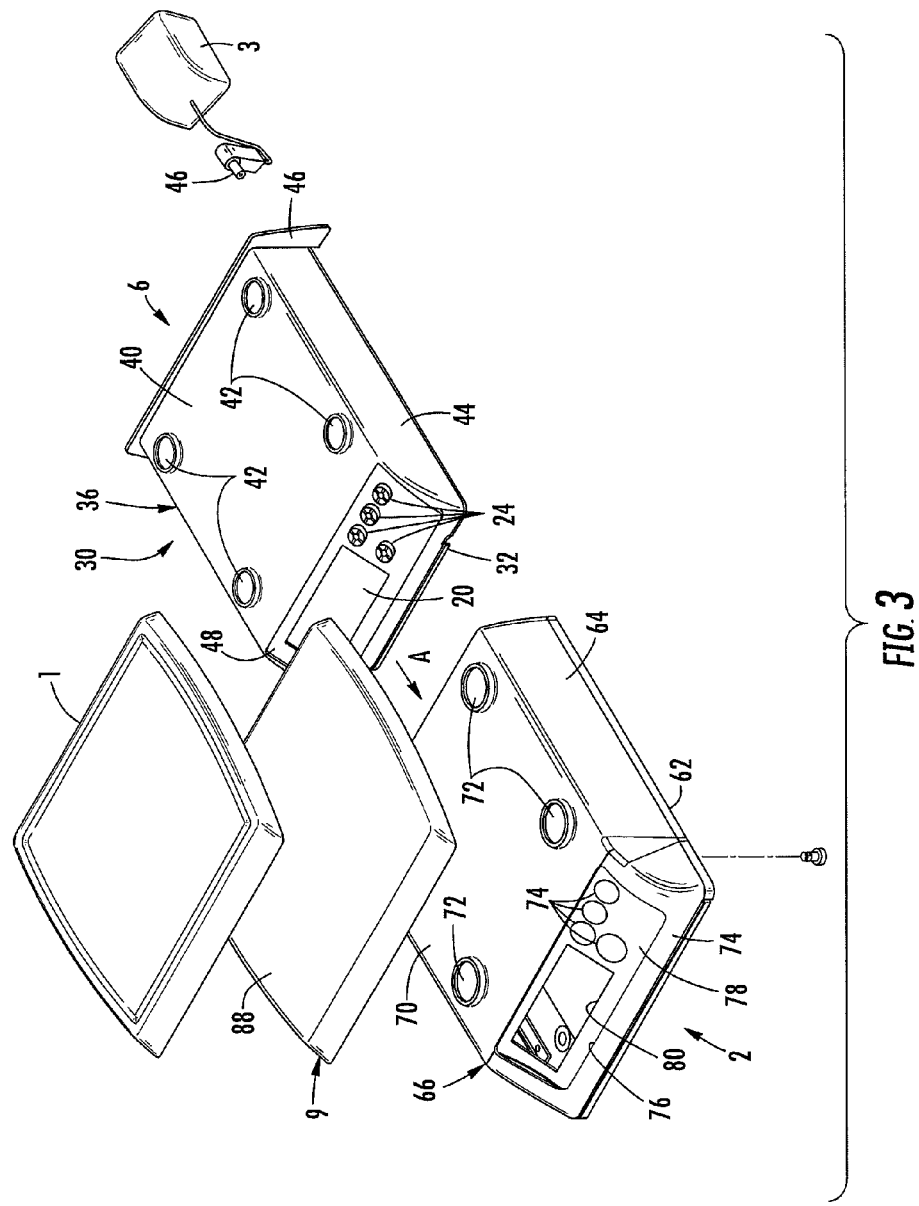
FIG. 3 is an exploded top view of the scale and cover of FIG. 1.
Figure 4:
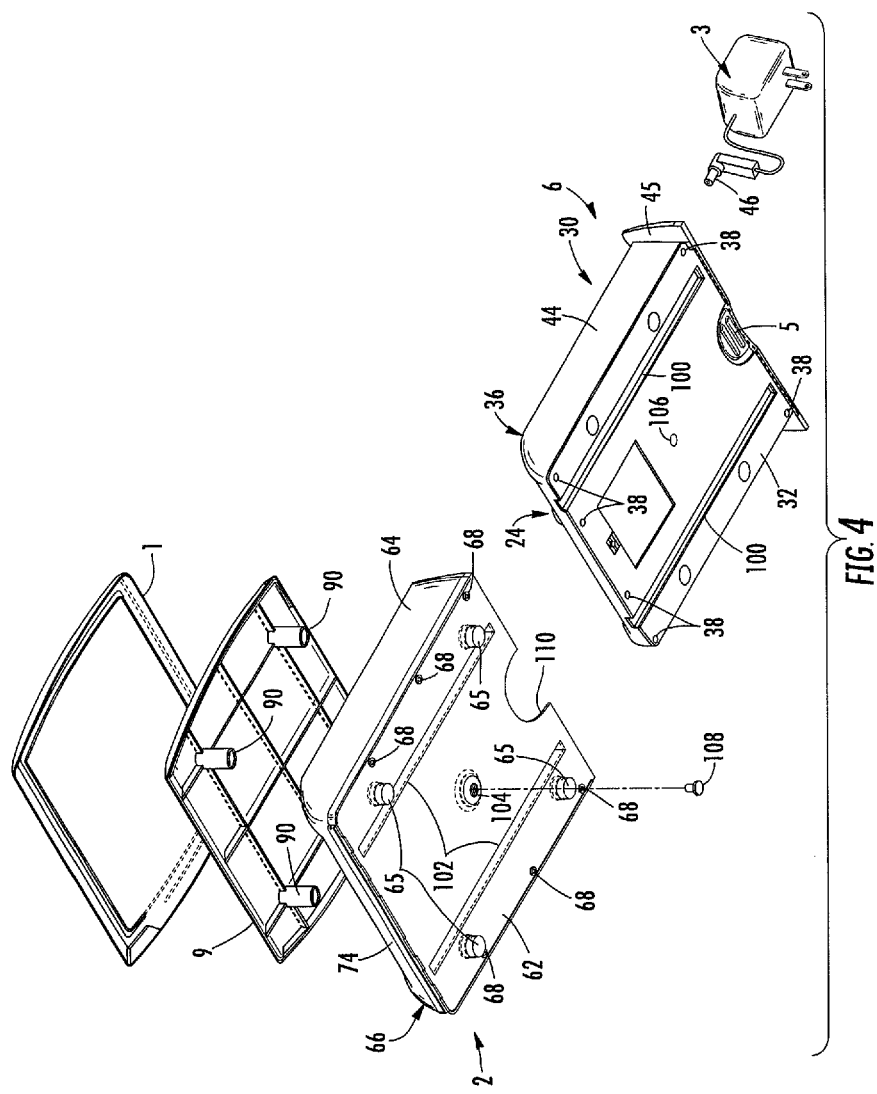
FIG. 4 is an exploded bottom view of the scale and cover of FIG. 1.
Figure 5:
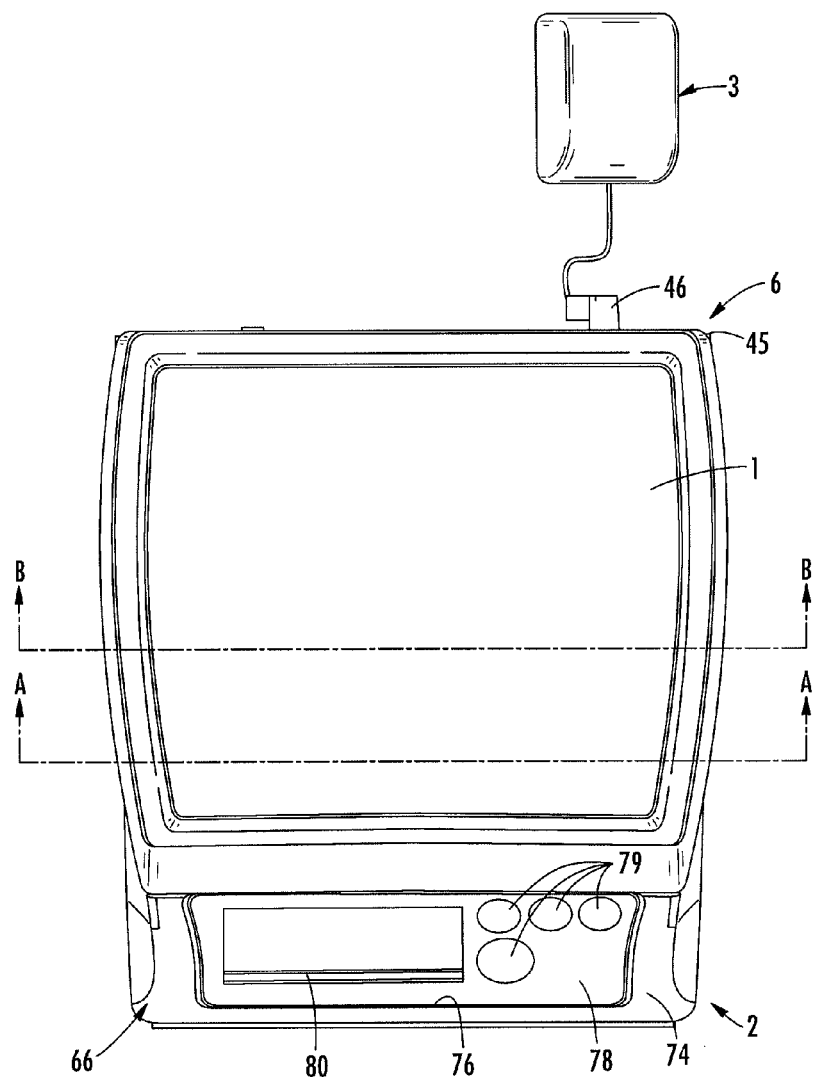
FIG. 5 is a top view of the scale and cover of FIG. 1.

The scale and shell of the invention comprises an electronic scale 6 that is housed in a shell or cover 2 during use. The scale 6 may be removed from the cover 2 and the cover 2 may be cleaned in a dishwasher without risk of damage to the scale. The cover 2 protects the scale 6 from dirt, grease and bacteria during normal use. The cover 2 can be removed from the scale 6 quickly and easily by the consumer for cleaning.

The scale 6 comprises an electronic scale having suitable electronic components 34 capable of weighing an article or material and providing a signal corresponding to the weight. The scale may further include additional circuitry for calibration, additional functions or the like. The signal is used to provide a digital read out on display 20 which may comprise an LCD screen or other similar display that displays the weight of an article or material placed on the scale tray 22 and/or other information to the user. The scale 6 may operate in any conventional manner to determine the weight. A power supply 3 supplies electric power to the scale via a connector 9 on the back wall 45 of the scale. Suitable user controls 24 are provided to control operation of the scale. In one embodiment of the invention the user controls 24 comprise push buttons that may be depressed by the user. The buttons may be physical buttons or "soft" buttons such as on a touch screen.

Figure 6:
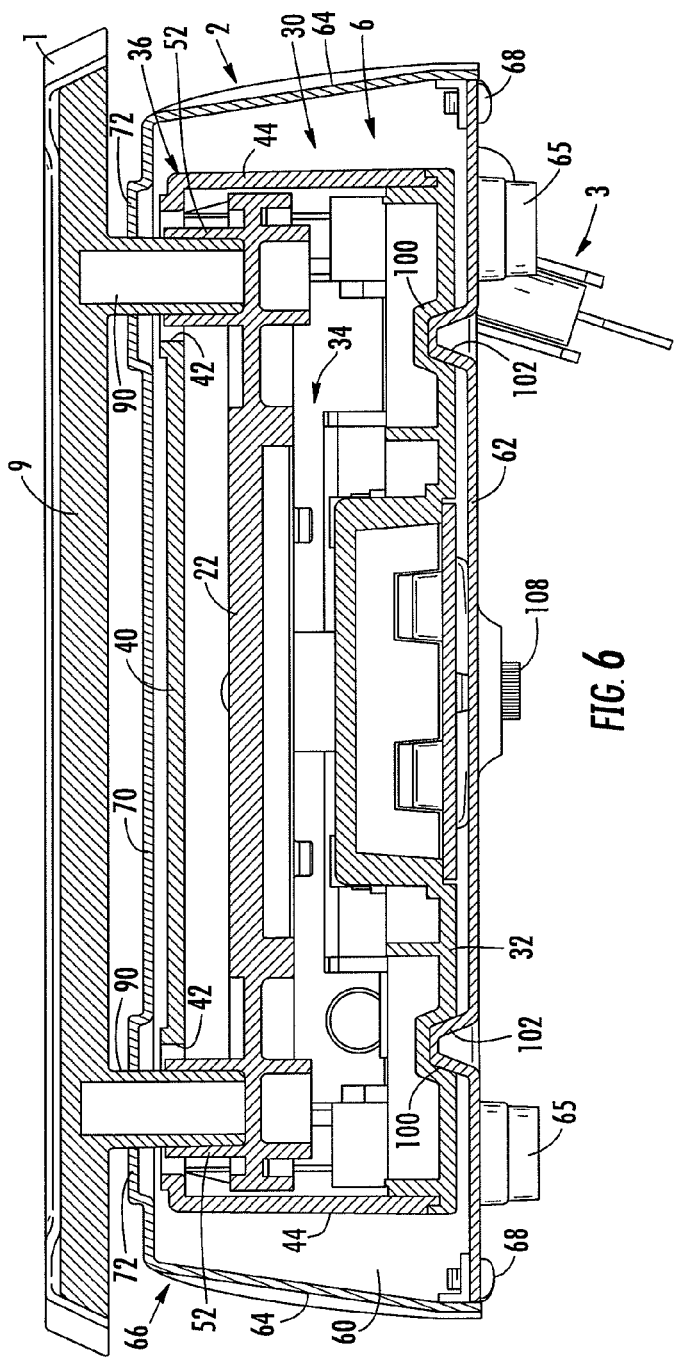
FIG. 6 is a section view taken along line A-A of FIG. 5.
Figure 7:
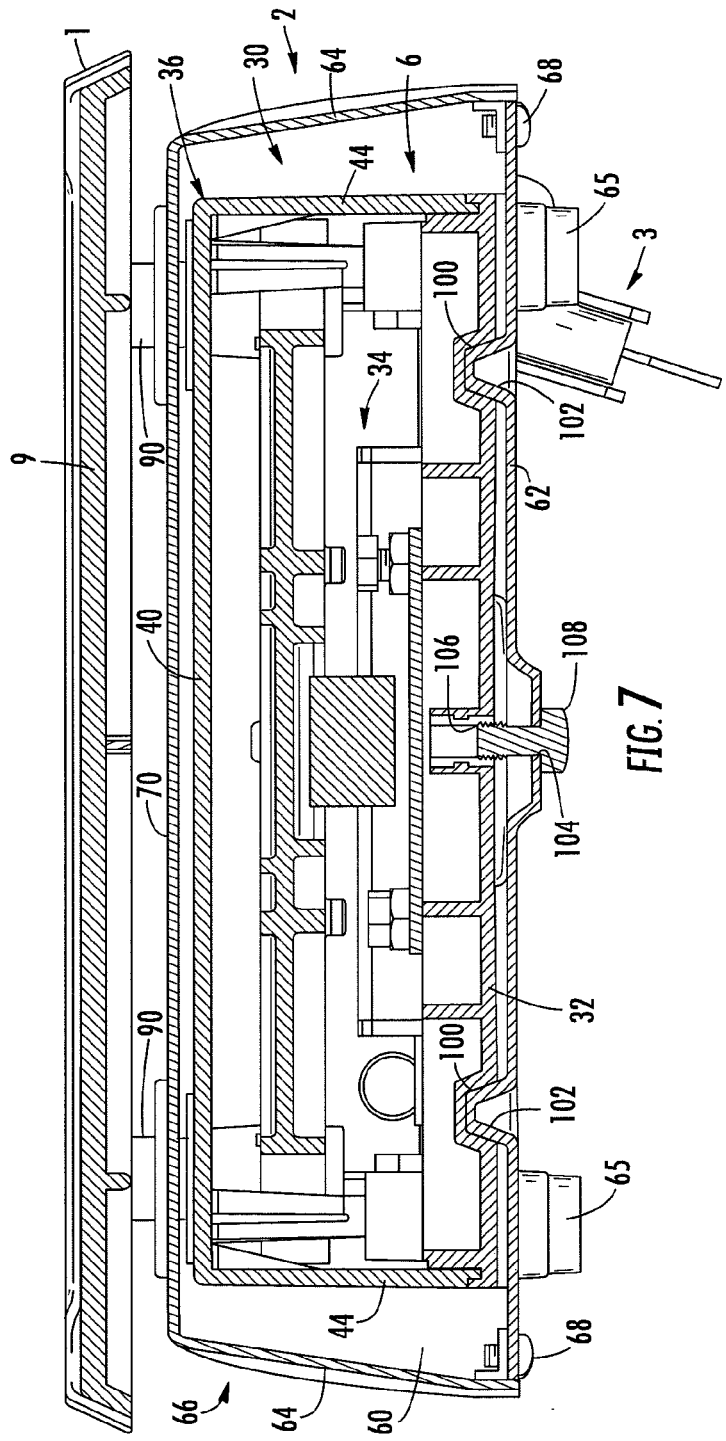
FIG. 7 is a section view taken along line B-B of FIG. 5.
Figure 8:
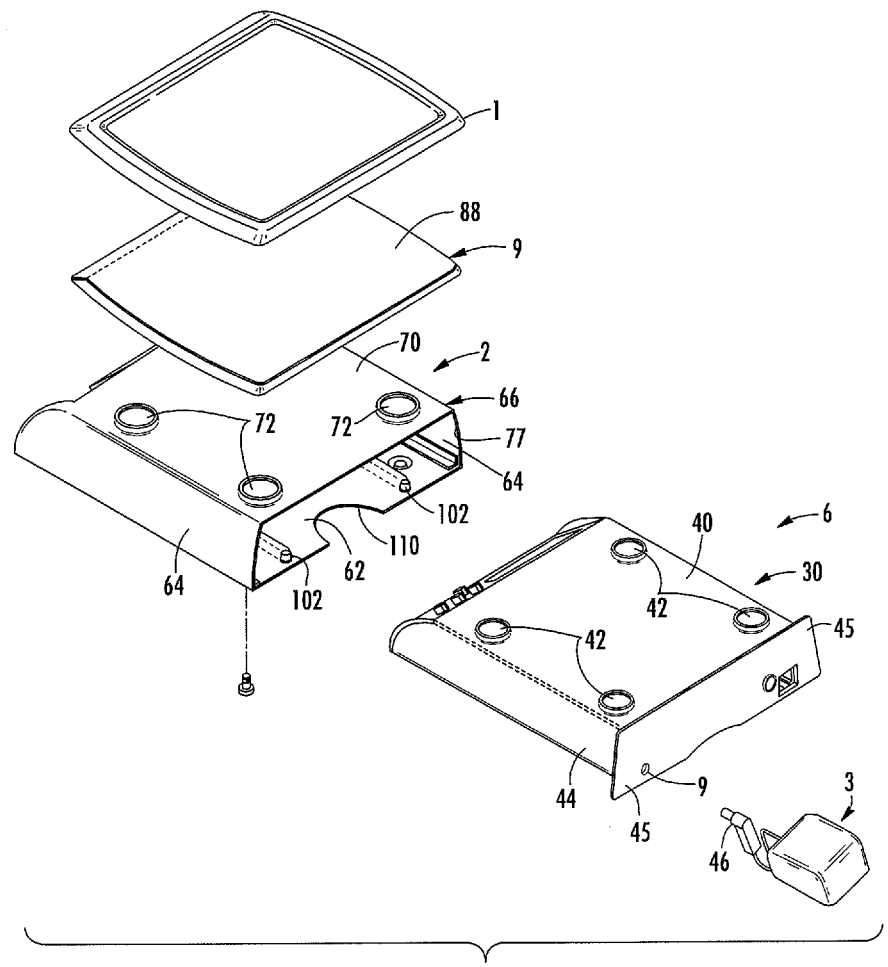
FIG. 8 is a rear perspective view of the scale and cover of FIG. 1.

Referring to FIGS. 3, 4, 6 and 7 the scale 6 comprises a scale housing 30 comprised of a base plate 32 that supports the electronics 34 and a shroud 36 that covers the scale electronics and may be secured to the bottom plate 32 by fasteners such as screws 38. The shroud 36 has a pair of side walls 44, a top wall 40 having spaced through holes or apertures 42 formed thereon that communicate the interior of the scale with the exterior, a back wall 45 and a front wall 48. The back wall 45 comprises an electrical connector for receiving the plug 46 of power supply 3. The back wall 45 of the scale is dimensioned to completely cover the opening 77 formed in cover 2 when the scale 6 is fully inserted into the cover 2. The front wall 48 supports the display 20 and the scale controls 24. The scale housing 30 may be made of plastic, stainless steel or other material. Referring to FIG. 6, the scale tray 22 is located inside of housing 30 and may be accessed via apertures 42 as will be explained. The scale tray 22 is provided with receptacles 52 that are located below and aligned with apertures 42. While the term "scale tray" has been used herein to identify the movable load supporting platform of scale 6, because the scale tray 22 does not directly support the articles or material being weighed and only supports the legs 90 of cover tray 9, the scale tray 22 need not be in the form of a tray and any structure capable of supporting the legs 90 of cover tray 9 may be used.

The cover 2 defines an interior space 60 that is dimensioned to receive the scale 6. In the illustrated embodiment the cover 2 has an external shape that generally corresponds to the shape of the scale 6; however, the shapes of the scale 6 and cover 2 may vary and need not physically conform to one another. The cover 2 comprises a base plate 62 that is attached to a shroud 66, such as by fasteners such as screws 68, that together define the interior space 60. The base plate 62 may be provided with elastomeric feet 65 to level the scale and minimize vibration. The shroud 66 has a pair of side walls 64; a top wall 70 having spaced through holes or apertures 72 formed thereon that communicate the interior 60 of the cover 2 with the exterior; and a front wall 74. The back of cover 2 defines an opening 77 that allows access to interior space 60. The cover 2 may be made of rigid plastic, stainless steel or other dishwasher safe material to create a rigid, unitary housing.

The front wall 74 comprises a cut-out portion that defines an aperture 76. Aperture 76 is covered by a flexible membrane 78 and is disposed so as to cover the controls 24 and display 20 when the scale 6 is inserted into cover 2. The membrane 78 is minimally spaced from or touching the controls 24 such that a user may push on and deform the flexible membrane to depress or otherwise manipulate the scale controls 24 that are positioned under the membrane 78. The membrane 78 may be transparent such that the user may view the controls 24 and display 20 through the membrane. Alternatively, the membrane 78 may be opaque and printed indicia such as writing, symbols or legends may be provided on the membrane 78 to identify the underlying scale controls 24. The indicia may comprise printed "buttons" 79 that are located over and correspond to the user controls 24 such that depressing the membrane 78 on a printed "button" location on the membrane 78 will guide the user to depress the corresponding user control 24 located under that printed "button". If the membrane 78 is opaque a window 80 may be created in the membrane that is disposed over the display 20 and allows a user to view the display 20 through the window. The window 80 may comprise a physical opening through the membrane 78 or a transparent portion of the membrane. The user controls 24 and display 20 may be located at any location on the scale 6 and need not be co-located provided that on the cover 2 the membrane 78 is disposed over the controls 24 in close proximity thereto and a window 80 is disposed over the display 20.

The scale cover 2 may further comprise a tray 9 and a tray cover 1. The tray 9 is provided with a flat surface or platform 88 on which the article or material being weighed may be placed. A plurality of legs 90 extend from the tray to support the tray 9 on the scale tray 22. While four legs 90 are provided a greater or fewer number of legs may be used provided that the legs can stably support the tray 9 on the scale tray 22. The legs 90 are provided in one-to-one correspondence with the apertures 72 in cover 2, the apertures 42 in scale 6 and the receptacles 52 in scale tray 22. While in the illustrated embodiment the legs 90 and apertures 42, 72 are arrayed in a square other arrays or configurations may be used. The legs 90 and apertures 42, 72 are dimensioned such that the legs 90 may freely pass through apertures 72 on cover 2 and apertures 42 on scale housing 30. The legs 90 are further dimensioned such that they can fit inside of the receptacles 52 formed on the scale tray 22 to properly seat the tray 9 relative to the scale 6. The legs 90 freely pass through the apertures 42 and 72 and rest on top of the scale tray 22 such that they are freely inserted and removed without the need to disassemble the cover 2 or scale 6 and without the need for tools or separate attachment mechanisms.

A separate tray cover 1 may be used if desired to protect and isolate the tray 9 from the material and articles being weighed. The tray cover 1 is provided with a flat top surface or platform 88 on which the article or material being weighed may be placed and a flat bottom surface that can rest on surface 88 of tray 9. In one embodiment the tray 9 and legs 90 are made of molded plastic and the tray cover 1 is made of stainless steel. The stainless steel tray cover 1 may be more easily cleaned and may be more suitable for use with some material such as foodstuffs. While the use of the tray cover 1 is optional both the tray 9 and tray cover 1 are made of a dishwasher safe material such that they may be cleaned in a dishwasher. Moreover, tray 9 may be made of stainless steel or have an integrally formed stainless steel platform.

The scale 6 is inserted into the cover 2 through opening 77 in a linear insertion direction A such that the scale 6 is disposed in cover 2 in proper alignment with membrane 78 and apertures 72. To ensure that the scale 6 is properly aligned in cover 2, the cover 2 and scale 6 are provided with mating alignment mechanisms such as male members on one of the scale and cover that mate with corresponding female members on the other one of the scale and cover. In the illustrated embodiment the exterior bottom surface of scale 6 is provided with the female member in the form of longitudinal recesses 100. The recesses 100 are aligned with the linear insertion direction A of the scale. The recesses 100 are engaged by a male member in the form of longitudinal rails or ribs 102 formed on the top interior surface of the bottom of cover 2. The rails 102 are aligned with the linear insertion direction of the scale. The rails 102 and recesses 100 extend along the direction of insertion of the scale from opening 77 into the cover 2 and locate the scale 6 relative to the cover 2 and guide insertion of the scale 6 into the cover 2 as the recesses slide over the rails during insertion of the scale 6. To ensure and maintain the aligned position, a through hole 104 is provided in the base plate 62 of cover 2 that is aligned with a threaded hole 106 formed in the base plate 32 of scale 6 when the scale is properly seated in the cover. A threaded member 108 such as a thumb screw is inserted into hole 104 and threadably engages threaded hole 106 to lock the scale 6 in position in the cover 2. The screw 108 may be removed to allow the scale 6 to be removed from the cover 2.

To insert the scale in the cover, the scale is inserted into opening 77 in the insertion direction and the recesses 100 of scale 6 are located on the rails 102 of cover 2. The scale is pushed into the cover with the recesses 100 riding on the rails 102 until apertures 42 are properly aligned with the apertures 72; the controls 24 are positioned behind membrane 78; and display 20 is visible through window 80. Threaded member 108 is inserted through hole 104 and threadably engages hole 106 and is tightened to fix the scale 6 in position relative to the cover 2. The tray 9 is positioned on the cover 2 and scale 6 by inserting legs 90 through holes 72 and 42 and seating the legs 90 in receptacles 52 of scale tray 22. The tray cover 1 may be placed on the tray 9. The power supply 3 is plugged into the receptacle on the back wall 45 of scale 6 and into an electrical outlet to power the scale.

To remove the scale 6 from the cover 2 the process is reversed. The power supply 3 is unplugged from the receptacle on the back wall 45 of scale 6 and from the electrical outlet. The tray cover 1 is removed from the tray 9. The legs 90 of tray 9 are withdrawn from holes 72 and 42 and tray 9 is removed. The threaded member 108 is unscrewed and withdrawn from the scale 6 and cover 2. The scale 6 is pulled from the cover 2 through opening 77. To facilitate removal of the scale, base plate 62 of cover 2 is provided with a cut-out area 110 along its back edge that allows a user to grip protrusions 5 formed on the base plate 32 of the scale 6 to provide a better grip for the user. Once the scale 6 is removed, the cover 2, tray 9 and tray cover 1 may all be cleaned in a dishwasher or by hand.

All areas of consumer contact during use are removable, with the tray 9, tray cover 1 and cover 2 being able to withstand the harsh environment of the commercial dishwasher. The cover 2, tray 9 and tray cover 1 may be made of non-rusting stainless steel or hard durable plastic such as ABS plastic. The tray 9, tray cover 1 and cover 2 are removable from the inner scale for quick and easy clean-ability in a dishwasher, especially the removal of bacteria and grease. The embodiments of the invention allow the user the ability to place external components of a digital scale in a dishwasher for the removal of bacteria and grease to reduce cross-contamination. The cover's surfaces are smooth for easier clean-ability.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:

1. A scale and cover comprising:
an electronic scale comprising a scale tray electronic components configured to determine the weight of a load on the scale tray, and a housing having an inside and an outside, the scale tray and electronic components being contained in the inside of the housing where the housing covers the electronic components and the scale tray, the housing defining a first aperture that provides communication between the inside of the housing and the outside of the housing, and a user control and a first alignment mechanism;
a cover for removably receiving the electronic scale such that the electronic scale is located inside of the cover, the cover defining a second aperture communicating the exterior of the cover with the electronic scale, the first aperture being aligned with the second aperture, and the cover comprising a second alignment mechanism that engages the first alignment mechanism;
a tray positioned external to the cover comprising a leg that is inserted through the first aperture and the second aperture and is supported by the scale tray.

2. The scale and cover of claim 1 wherein the user control comprises a push button.

3. The scale and cover of claim 1 wherein the cover comprises a flexible membrane where the flexible membrane is disposed over the user control.

4. The scale and cover of claim 3 wherein the flexible membrane is transparent.

5. The scale and cover of claim 3 wherein the flexible membrane comprises indicia to identify the control.

6. The scale and cover of claim 5 wherein the flexible membrane is opaque.

7. The scale and cover of claim 5 wherein the indicia comprises a printed button.

8. The scale and cover of claim 1 wherein the scale tray comprises a receptacle that receives the leg.

9. The scale and cover of claim 1 wherein the cover defines an interior space that is dimensioned to receive the scale and comprises an opening communicating with the interior space.

10. The scale and cover of claim 1 further comprising a tray cover for covering the tray.

11. The scale and cover of claim 1 wherein the first alignment mechanism comprises one of an elongated recess and a raised rib and the second alignment mechanism comprises another one of the elongated recess and the raised rib.

12. The scale and cover of claim 1 further comprising a fastener for securing the cover to the scale.

13. A scale and cover comprising:
an electronic scale comprising a scale tray and electronic components configured to determine the weight of a load on the scale tray, and a housing having an inside and an outside, the scale tray and electronic components being contained in the inside of the housing where the housing covers the electronic components and the scale tray, the housing defining a first plurality of apertures that provides communication between the inside of the housing and the outside of the housing, and a display and a first alignment mechanism;
a cover for removably receiving the electronic scale such that the electronic scale is located inside of the cover, the cover defining a second plurality of apertures communicating the exterior of the cover with the electronic scale, the cover comprising a window that is disposed over and covers the display, and the cover comprising a second alignment mechanism that engages the first alignment mechanism;
a tray positioned external to the cover comprising a plurality of legs that are inserted through the first plurality of apertures and the second plurality of apertures and are supported by the scale tray.

14. The scale and cover of claim 13 wherein the cover defines an interior space that is dimensioned to receive the scale and comprises an opening communicating with the interior space.

15. The scale and cover of claim 14 wherein the first alignment mechanism comprises one of a recess and raised rib and the second alignment mechanism comprises another one of the recess and the raised rib, the rib and recess oriented along an insertion direction of the electronic scale into the cover such that the rib slides in the recess as the electronic scale is inserted into the cover.

16. The scale and cover of claim 13 further comprising a fastener for securing the cover to the scale.

17. The scale and cover of claim 13 further comprising a tray cover for covering the tray.

18. A method of operating a scale and a scale cover comprising:

prov234ing an electronic scale comprising a scale tray and electronic components configured to determine the weight of a load on the scale tray, and a housing having an inside and an outside, the scale tray and electronic components being contained in the inside of the housing where the housing covers the electronic components and the scale tray, the housing defining a first aperture that provides communication between the inside of the housing and the outside of the housing, and a first alignment mechanism on the housing and a cover for removably receiving the electronic scale comprising a second alignment mechanism and a second aperture;

aligning the first alignment mechanism with the second alignment mechanism;

pushing the scale into the cover until the aperture is aligned with the scale tray and the electronic scale is located inside of the cover;

mounting a tray positioned external to the cover on the scale tray by inserting a leg on the tray through the first aperture and the second aperture such that the leg is supported on the scale tray.

* * * * *

UNITED STATES PATENT AND TRADEMARK OFFICE
CERTIFICATE OF CORRECTION

PATENT NO. : 8,796,565 B2
APPLICATION NO. : 13/288408
DATED : August 5, 2014
INVENTOR(S) : Lauer Page 1 of 1

It is certified that error appears in the above-identified patent and that said Letters Patent is hereby corrected as shown below:

In the Claims

Claim 1, Column 5, Line 64, insert --and-- between "tray" and "electronic".

Signed and Sealed this
Twenty-first Day of October, 2014

Michelle K. Lee
*Deputy Director of the United States Patent and Trademark Office*